US011873818B2

(12) United States Patent
Yang et al.

(10) Patent No.: US 11,873,818 B2
(45) Date of Patent: Jan. 16, 2024

(54) CEILING FAN

(71) Applicant: LG ELECTRONICS INC., Seoul (KR)

(72) Inventors: Seungdeok Yang, Seoul (KR); Jaehyuk Jung, Seoul (KR); Seokho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 17/472,785

(22) Filed: Sep. 13, 2021

(65) Prior Publication Data

US 2022/0082106 A1 Mar. 17, 2022

(30) Foreign Application Priority Data

Sep. 15, 2020 (KR) ........................ 10-2020-0118175

(51) Int. Cl.
*F04D 29/38* (2006.01)
*F04D 25/08* (2006.01)

(52) U.S. Cl.
CPC ......... *F04D 25/088* (2013.01); *F04D 29/384* (2013.01); *F05D 2240/301* (2013.01); *F05D 2240/305* (2013.01); *F05D 2240/307* (2013.01); *F05D 2250/38* (2013.01)

(58) Field of Classification Search
CPC ............................... F04D 5/088; F04D 29/384
See application file for complete search history.

(56) References Cited

U.S. PATENT DOCUMENTS

| | | | | |
|---|---|---|---|---|
| 9,726,192 | B2 * | 8/2017 | Whitley | F04D 29/325 |
| 10,527,046 | B2 * | 1/2020 | Niemiec | F04D 29/384 |
| 11,572,891 | B1 * | 2/2023 | Hsieh | F04D 29/681 |
| 2013/0272879 | A1 * | 10/2013 | Chen | F04D 25/088 416/5 |

FOREIGN PATENT DOCUMENTS

KR 10-2019-0140865 12/2019

* cited by examiner

*Primary Examiner* — Sabbir Hasan
(74) *Attorney, Agent, or Firm* — KED & ASSOCIATES

(57) ABSTRACT

A ceiling fan may include a column; a hub case coupled to the column and rotatable with respect to the column; and a plurality of blades disposed at the hub case, and arranged radially around the column. Each blade may include a lower blade having a first side coupled to the hub case and a second side, opposite to the first side, directed radially outwardly; an upper blade spaced apart from the lower blade, and having a first side coupled to the hub case and a second side, opposite to the first side, directed radially outwardly; and an air gap disposed between the lower blade and the upper blade. The blade may be formed as a tandem blade, thereby generating a greater lift force than a blade having one positive pressure surface and one negative pressure surface, such that an air volume may increase at a same power output.

21 Claims, 8 Drawing Sheets

CEILING FAN

CROSS-REFERENCE TO RELATED APPLICATION(S)

This application claims priority under 35 U.S.C. § 119 to Korean Application No. 10-2020-0118175 filed in Korea on Sep. 15, 2020, whose entire disclosure(s) is/are hereby incorporated by reference.

BACKGROUND

1. Field

A ceiling fan configured to be installed on a ceiling is disclosed herein.

2. Background

A ceiling fan is a fan configured to be installed on a ceiling of a room to generate an air flow. The ceiling fan consumes less power than an air conditioner or a general fan, and directs an air flow from the ceiling towards a floor, thereby producing an air convection effect. That is, the ceiling fan, suspended from the ceiling above a user, may provide forced convection of a relatively large volume of air.

Generally, the ceiling fan includes a drive motor that supplies power, and a plurality of blades coupled to a shaft of the drive motor. Korean Laid-Open Patent Publication No. 10-2019-0140865 (hereinafter referred to as "related art"), which is hereby incorporated by reference, discloses a ceiling fan. The ceiling fan according to the related art includes a main blade and a sub-blade. However, the ceiling fan according to the related art has a problem in that a portion of the main blade is cut to install the sub-blade in the main blade, such that its lift force generated by rotation of the sub-blade is limited.

BRIEF DESCRIPTION OF THE DRAWINGS

The embodiments will be described in detail with reference to the following drawings in which like reference numerals refer to like elements, and wherein.

DETAILED DESCRIPTION

Figure 1:
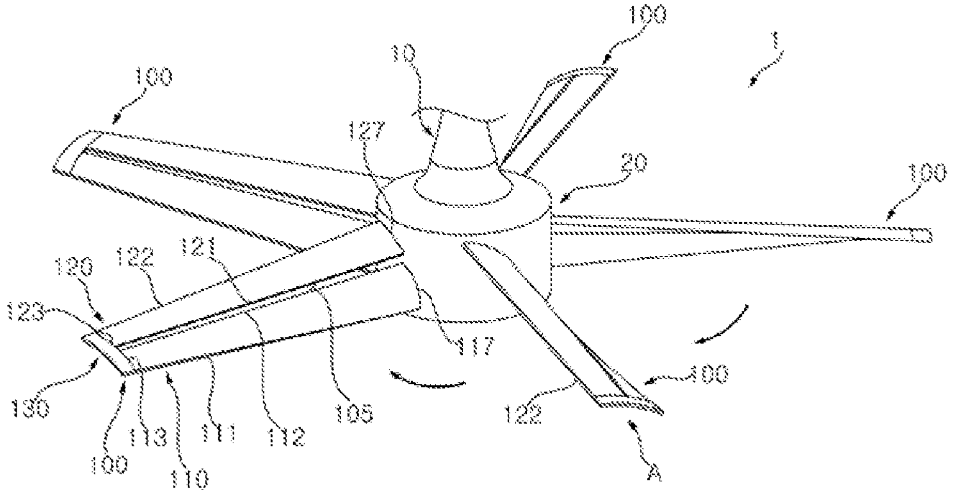
FIG. 1 is a perspective view of a ceiling fan according to an embodiment.

Advantages and features of embodiments and methods for achieving those of the embodiments will become apparent upon referring to embodiments described later with reference to the attached drawings. However, embodiments are not limited to the embodiments disclosed hereinafter and may be embodied in different ways. The embodiments are provided for perfection of disclosure and for informing persons skilled in this field of art of the scope. The same reference numerals may refer to the same elements throughout the specification.

Spatially relative terms such as "below", "beneath", "lower", "above", or "upper" may be used herein to describe one element's relationship to another element as illustrated in the Figures. It will be understood that spatially relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially relative terms may be interpreted in accordance with the orientation of the device.

The terminology used hereinafter is for the purpose of describing embodiments only and is not intended to limit. As used hereinafter and in the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, a thickness or size of each layer may be exaggerated, omitted, or schematically illustrated for convenience of description and clarity. Also, a size or area of each constituent element does not entirely reflect an actual size thereof.

Hereinafter, embodiments will be described with reference to the accompanying drawings.

Figure 2:
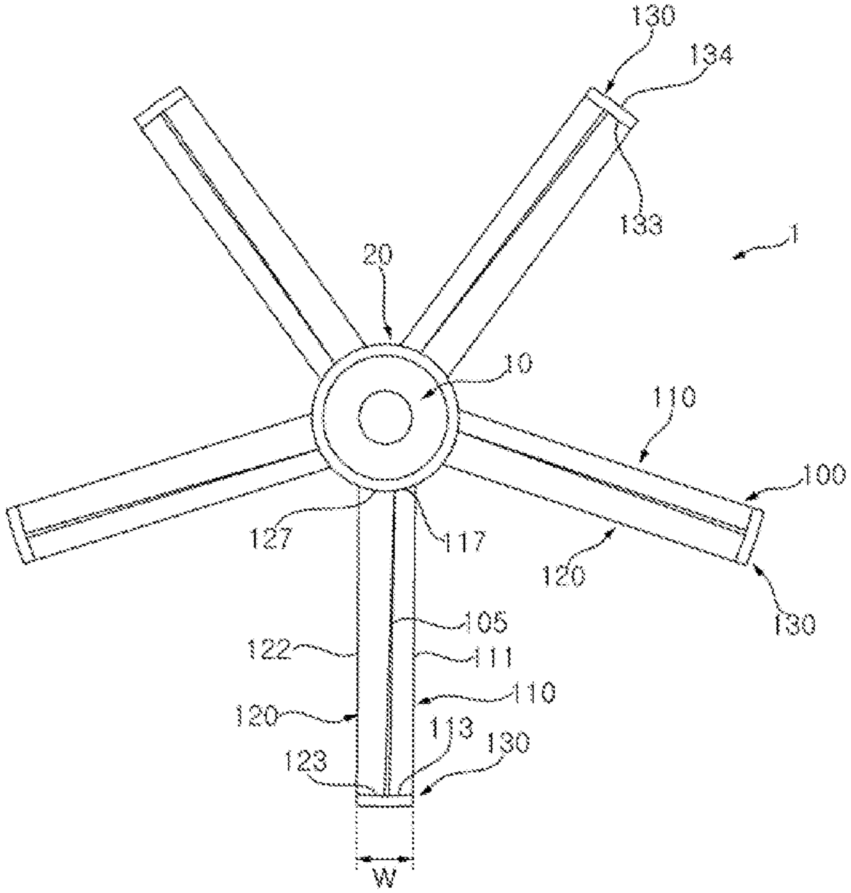
FIG. 2 is a plan view of the ceiling fan of FIG. 1.

FIG. 1 is a perspective view of a ceiling fan according to an embodiment. FIG. 2 is a plan view of the ceiling fan of FIG. 1.

Referring to FIGS. 1 and 2, a ceiling fan 1 according to an embodiment may include a column 10 configured to be fixed to a ceiling; a hub case 20 disposed below the column 10 and rotatable with respect to the column 10; a plurality of blades 100 disposed at the hub case 20 and arranged radially around the column 10; and a motor (not shown) disposed inside of the hub case 20, fixed at a side of the column 10, and providing torque to the hub case 20.

The column 10 may be elongated in a vertical direction. An upper end of the column 10 may be fixed to the ceiling, and a lower end of the column 10 may be coupled to the hub case 20. The lower end of the column 10 may be rotatable relative to the hub case 20.

The hub case 20 may be rotatable relative to the column 10. The hub case 20 may be a cylindrical shape, and the plurality of blades 100 may be coupled to the hub case 20.

The plurality of blades 100 may be disposed to protrude radially outwardly from an outer circumferential surface of the hub case 20. When viewed from a top, the plurality of blades 100 may be disposed radially about the column 10. In this embodiment, five blades are disposed; however, embodiments are not limited thereto, and the number of blades 100 may vary. When it is required to distinguish the blades 100, the five blades 100 may be divided into first to fifth blades.

Figure 3:
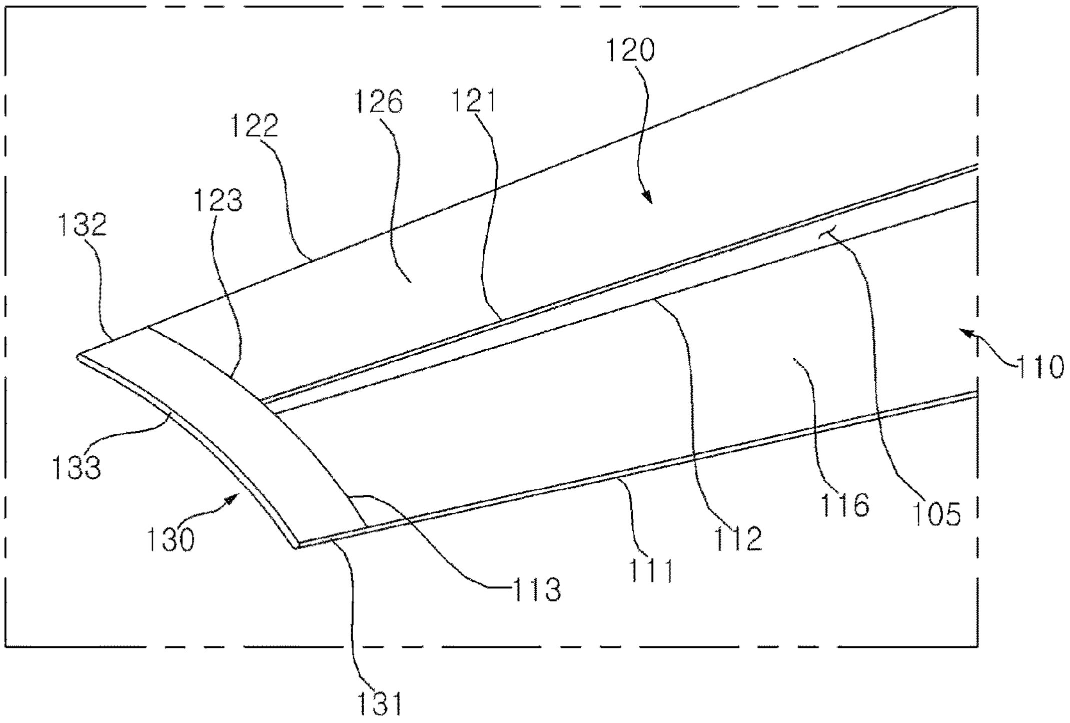
FIG. 3 is a partially enlarged view of a blade of the ceiling fan of FIG. 1.
Figure 4:
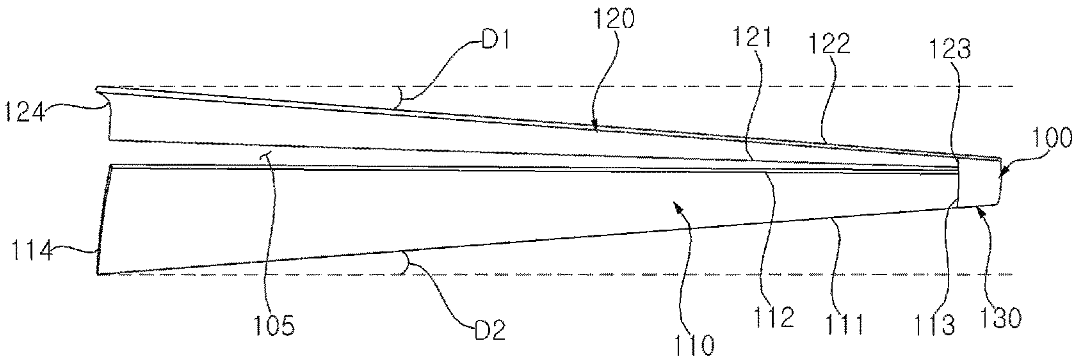
FIG. 4 is a front view of the blade of the ceiling fan of FIG. 1.
Figure 5:
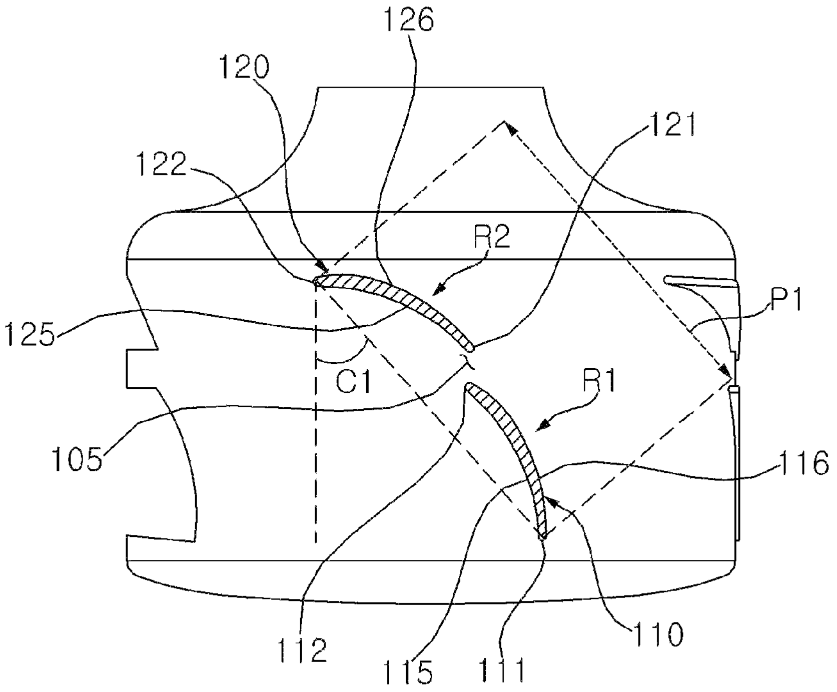
FIG. 5 is a cutaway view of a cross-section of the blade at a hub side of the ceiling fan of FIG. 1.
Figure 6:
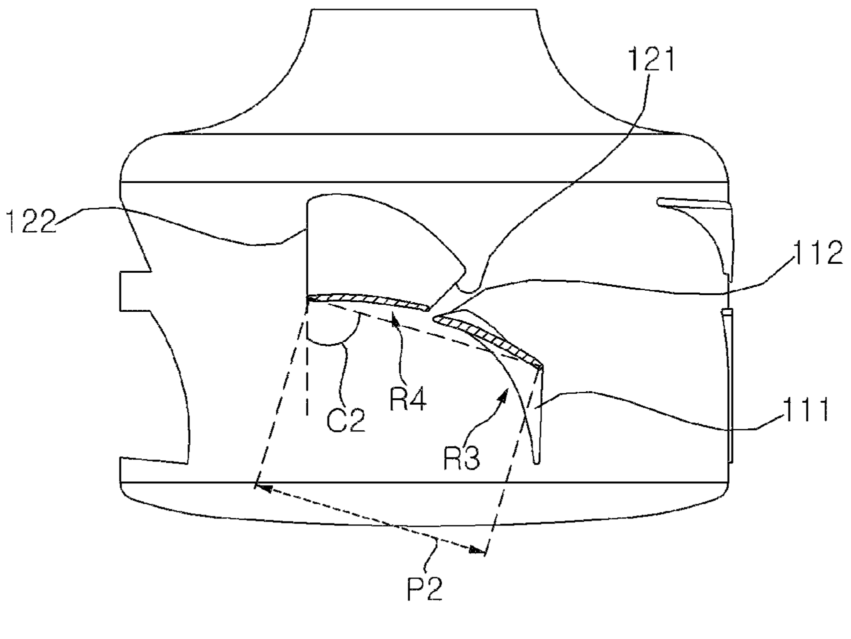
FIG. 6 is a cutaway view of a cross-section of the blade at a tip side of the ceiling fan of FIG. 1.

FIG. 3 is a partially enlarged view of a blade of the ceiling fan of FIG. 1. FIG. 4 is a front view of the blade of the ceiling fan of FIG. 1. FIG. 5 is a cutaway view of a cross-section of the blade at a hub side of the ceiling fan of FIG. 1. FIG. 6 is a cutaway view of a cross-section of the blade at a tip side of the ceiling fan of FIG. 1.

Referring to FIG. 1 or FIG. 3, the blade 100 may include a lower blade 110 having one or a first side 117 coupled to the hub case 20 and an opposite or second side 113 directed radially outwardly; an upper blade 120 spaced apart from the lower blade 110, and having one or a first side 127 coupled to the hub case 20 and an opposite or second side 123 directed radially outwardly; and a tip 130 that connects the respective second sides 113 and 123 of the lower blade 110 and the upper blade 120.

The lower blade 110 and the upper blade 120 may be spaced apart from each other to form an air gap 105. The air gap 105 may be formed in a range of 2% to 4% of a width of the lower blade 110 and the upper blade 120.

The air gap 105 may be a separation gap in a horizontal direction. The air gap 105 may be a separation gap in a vertical direction. In this embodiment, the air gap 105 is disposed diagonally with respect to the lower blade 110 and the upper blade 120. Referring to FIG. 5 or FIG. 6, a width P1 of the respective first sides 117 and 127 of the lower blade 110 and the upper blade 120 may be 140 mm, a width P2 of the respective second sides 113 and 123 thereof may be 98 mm, and the air gap 105 may be 3 mm in width.

The lower blade 110 and the upper blade 120 may be spaced apart from the column 10 in a radial direction. The lower blade 110 and the upper blade 120 may also be spaced apart in a vertical direction. When it is required to distinguish components of each of the lower blade 110 and the upper blade 120, the terms "lower" and "upper" will be used.

A vertical cross-section of the lower blade 110 may have an airfoil shape. The lower blade 110 may include a lower end 111 that forms a lower edge in the radial direction; an upper end 112 that forms an upper edge in the radial direction; the second side 113 coupled to the tip 130; the first side 117 coupled to the hub case 20; a positive pressure surface 115 that connects the lower end 111 and the upper end 112 and directed downwardly; and a negative pressure surface 116 that connects the lower end 111 and the upper end 112 and directed upwardly.

The lower end 111 and the upper end 112 are elongated in a horizontal direction. When viewed from a top, the lower end 111 and the upper end 112 are directed in a radially outward direction.

In this embodiment, the lower end 111 and the upper end 112 are linearly formed. When viewed from the side (see FIG. 4), the lower end 111 forms a predetermined inclination angle D2 with respect to a horizontal direction. In this embodiment, the inclination angle D2 is four degrees. One or a first side (hub case side) of the lower end 111 may be disposed below the opposite or a second side (tip side).

Referring to FIG. 5 or FIG. 6, the first side 117 may be a boundary line connected to the hub case 20, and the second side 113 may be a boundary line connected to the tip 130. When viewed in vertical cross-section, the first side 117 and the second side 113 may be formed as curved lines, and when viewed from a front or from a side, the first side 117 and the second side 113 may be formed in a vertical direction.

The positive pressure surface 115 and the negative pressure surface 116 may be formed as curved surfaces which are concave upward from a bottom. The positive pressure surface 115 may be inclined downwardly, and the negative pressure surface 116 may be inclined upwardly. The negative pressure surface 116 may be disposed above the positive pressure surface 115.

When viewed in vertical cross-section, the lower blade 110 may have a radius of curvature. A radius of curvature R1 on the first side 117 of the lower blade 110 may be in a range of 90 mm to 95 mm and may be located on a lower side of the lower blade 110. A radius of curvature R3 on the second side 113 of the lower blade 110 may be in a range of 130 mm to 140 mm and may be located on the lower side of the lower blade 110.

That is, the second side 113 of the lower blade 110 may have a lesser curved surface than the first side 117. The radius of curvature may gradually increase from the first side 117 to the second side 113.

Referring to FIG. 5 or FIG. 6, a vertical cross-section of the upper blade 120 may have an airfoil shape. The upper blade 120 may include a lower end 121 that forms a lower edge in the radial direction; an upper end 122 that forms an upper edge in the radial direction; the second side 123 coupled to the tip 130; the first side 127 coupled to the hub case 20; a positive pressure surface 125 that connects the lower end 121 and the upper end 122 and directed downwardly; and a negative pressure surface 126 that connects the lower end 121 and the upper end 122 and directed upwardly.

The lower end 121 and the upper end 122 are elongated in a horizontal direction. When viewed from the top, the lower end 121 and the upper end 122 are directed in a radially outward direction.

In this embodiment, the lower end 121 and the upper end 122 are linearly formed. When viewed from the side (see FIG. 4), the upper end 122 forms a predetermined inclination angle D1 with respect to a horizontal direction. In this embodiment, the inclination angle D2 is four degrees. In this embodiment, the inclination angle D1 of the lower blade 110 is equal to the inclination angle D2 of the upper blade 120. Further, one or a first side (hub case side) of the upper end 122 may be disposed above the opposite or a second side (tip side).

The first side 127 is a boundary line connected to the hub case 20, and the second side 123 is a boundary line connected to the tip 130. When viewed in vertical cross-section, the first side 127 and the second side 123 may be formed as curved lines, and when viewed from the front or from the side, the first side 127 and the second side 123 may be formed in a vertical direction.

The positive pressure surface 125 and the negative pressure surface 126 may be formed as curved surfaces which are concave upward from the bottom. The positive pressure surface 125 may be inclined downwardly, and the negative pressure surface 126 may be inclined upwardly. The negative pressure surface 126 may be disposed above the positive pressure surface 125.

When viewed in vertical cross-section, the upper blade 120 may have a radius of curvature. A radius of curvature R2 on the first side 127 of the upper blade 120 may be in a range of 82 mm to 90 mm and may be located on a lower side of the upper blade 120. A radius of curvature R4 on the second side 123 of the upper blade 120 may be in a range of 280 mm to 290 mm and may be located on the lower side of the upper blade 120.

That is, the second side 123 of the upper blade 120 may have a lesser curved surface than the first side 127. The radius of curvature may gradually increase from the first side 127 to the second side 123. Further, the radiuses of curvature of the lower blade 110 and the upper blade 120 may have a size relationship of R4>R3>R1>R2.

The blade 100 in this embodiment has slopes C1 and C2 with respect to a virtual line that connects the upper end 122 of the upper blade 120 and the lower end 111 of the lower blade 110. The slopes C1 and C2 may be pitch angles of the blade 100.

Referring to FIG. 5, the slope C1 may be defined as a slope between a virtual line, that connects the upper end 122 of the first side 127 of the upper blade 120 and the lower end 111 of the first side 117 of the lower blade 110, and a vertical direction. The slope C1 may be formed in a range of 35 degrees to 45 degrees, and may be 41 degrees in this embodiment.

Referring to FIG. 6, the slope C2 may be defined as a slope between a virtual line, that connects the upper end 122 of the second side 123 of the upper blade 120 and the lower end 111 of the second side 113 of the lower blade 110 and a vertical direction. The slope C2 may be formed in a range of 70 degrees to 80 degrees, and may be 75 degrees in this embodiment.

The slope C1 of the first side 117 and 127 of the blade 100 may be greater than the slope C2 of the second side 113 and 123. In the blade 100, the slope C1 of the first side 117 and 127 may gradually increase to the slope C2 of the second side 113 and 123. Accordingly, in this embodiment, the blade 100 becomes more horizontal from the first side 117 and 127 toward the second side 113 and 123.

Referring to FIG. 2, a diameter of the ceiling fan may be 52 inches, that is, 1320.8 mm.

By changing the slopes C1 and C2, a width W of the blade 100 may be maintained constant. When viewed from the top, the width W of the blade 100 may be 96 mm, and widths W of a radially inner side and a radially outer side of the blade 100 may be equal to each other. The widths W may vary according to embodiments.

When viewed from the top, the upper blade 120 and the lower blade 110 may partially overlap each other.

Referring to FIGS. 1 to 3, the tip 130 connects the respective second sides 113 and 123 of the lower blade 110 and the upper blade 120. The tip 130 may be coupled to the respective second sides 113 and 123 of the lower blade 110 and the upper blade 120. Unlike this embodiment, it is also possible that the lower blade 110 and the upper blade 120, including the tip 130, may be integrally formed with each other, and then the first side thereof may be coupled to the hub case 20.

The respective second sides 113 and 123 of the lower blade 110 and the upper blade 120 may be coupled to a radially inner edge of the tip 130. The tip 130 provides rigidity to the lower blade 110 and the upper blade 120, and may maintain the air gap 105 during rotation.

Figure 7:
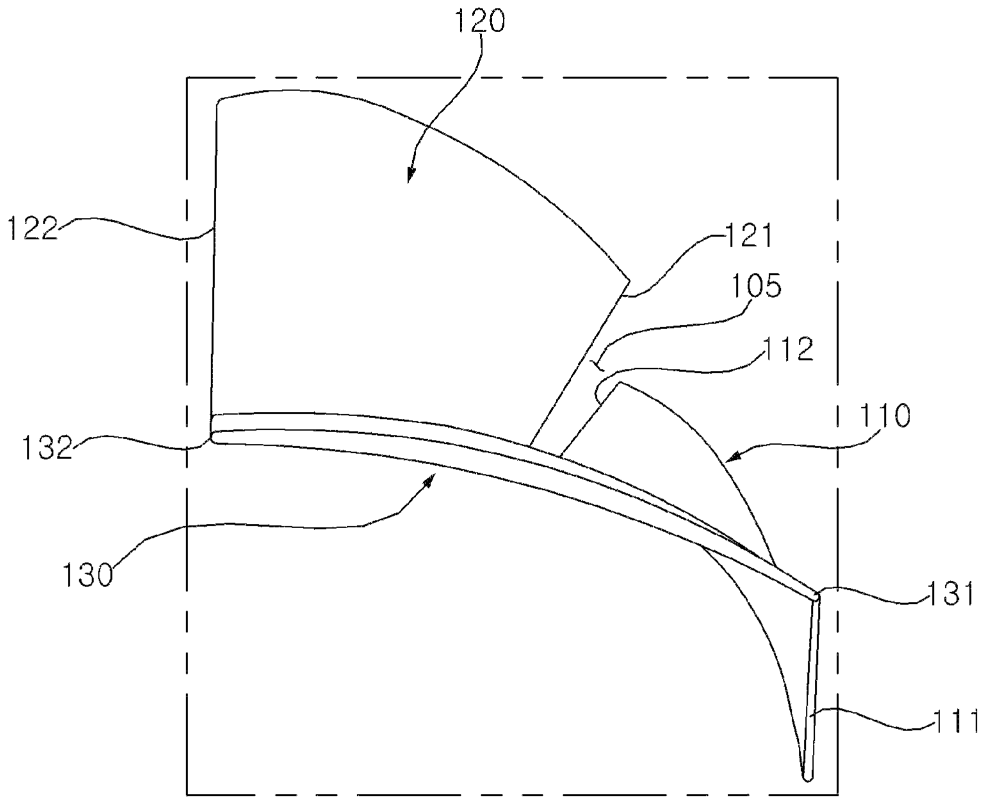
FIG. 7 is a side view of the blade as seen from direction A of the ceiling fan of FIG. 1.

When viewed from the top, an inner edge 133 and an outer edge 134 of the tip 130 may have an arc shape. Referring to FIG. 7, when viewed from the side, the inner edge 133 and the outer edge 134 of the tip 130 may also have an arc shape.

A lower end 131 of the tip 130 may provide a continuous surface with the lower end 111 of the lower blade 110, and an upper end 132 of the tip 130 may provide a continuous surface with the upper end 122 of the upper blade 120. An upper surface of the tip 130 may provide a continuous flat surface with the negative pressure surface 116 of the lower blade 110 and the negative pressure surface 126 of the upper blade 120. A lower surface of the tip 130 may provide a continuous flat surface with the positive pressure surface 115 of the lower blade 110 and the positive pressure surface 125 of the upper blade 120.

As described above, the tip 130 may be coupled to radially outer ends of the lower blade 110 and the upper blade 120, thereby preventing torsional deformation of the blade 100 during operation.

Figure 8:
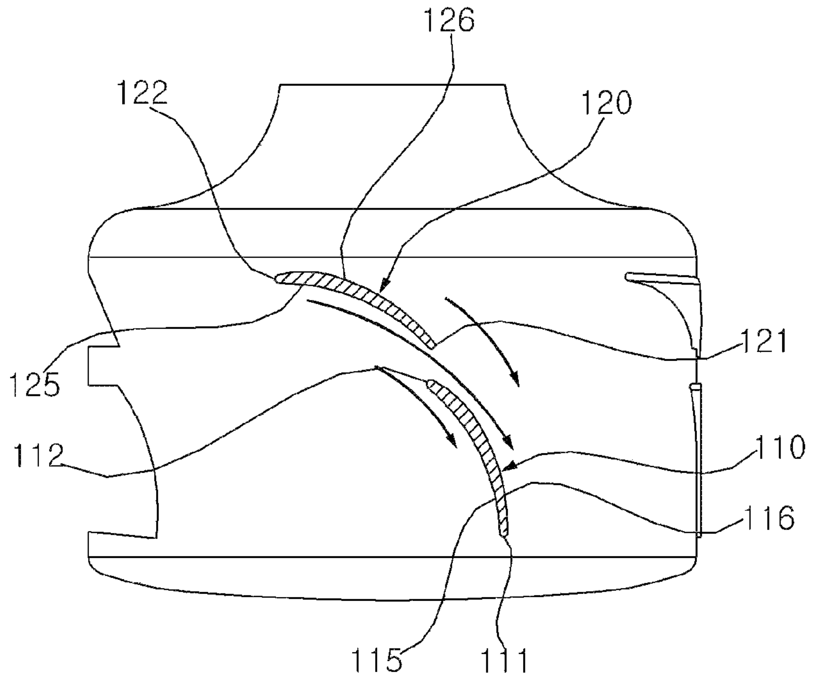
FIG. 8 is a diagram illustrating an example of an air flow of the blade at the hub side of FIG. 5.
Figure 9:
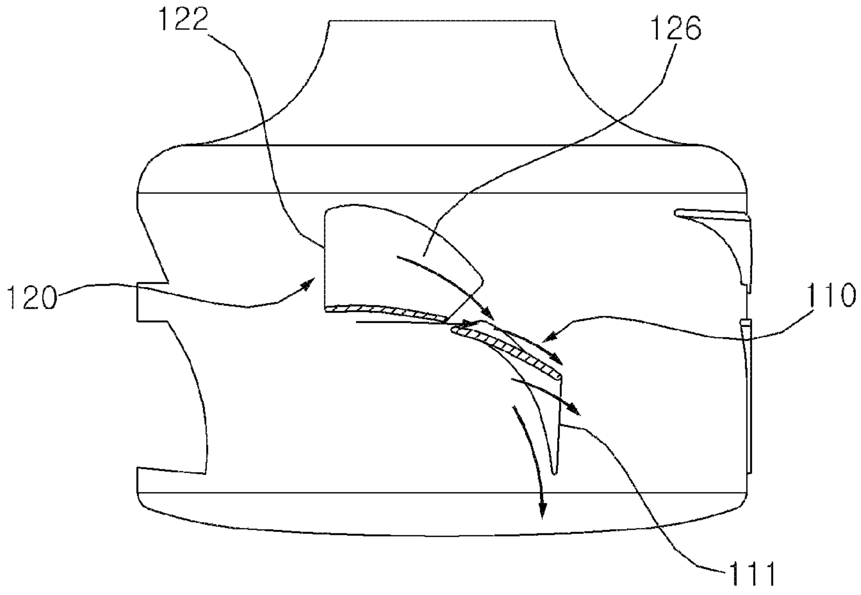
FIG. 9 is a diagram illustrating an example of an air flow of the blade at the tip side of FIG. 6.

An air flow during rotation of the ceiling fan will be described hereinafter with reference to FIG. 8 or FIG. 9.

During rotation of the hub case 20, the plurality of blades 100 are also rotated therewith. In this case, with respect to one blade 100, air pressurized by the upper blade 120 may flow to the lower blade 110.

More specifically, air pressurized on the positive surface 125 of the upper blade 120 may flow to the negative pressure surface 116 of the lower blade 110 through the air gap 105, may flow downwardly along the negative pressure surface 116 of the lower blade 110, and then may be separated from the lower end 111 to be discharged downwardly. Further, the air pressurized on the positive pressure surface 115 of the lower blade 110 may be separated from the lower end 111 to be discharged downwardly.

As described above, the blade according to embodiments disclosed herein may be formed as a tandem blade, thereby generating a greater lift force than a blade having one positive pressure surface and one negative pressure surface, such that an air volume may increase at a same power output. The blade having the lower blade and the upper blade may have a same width in the radial direction, such that the lower blade and the upper blade may be operated as one blade.

The radially outer sides of the lower blade and the upper blade may be connected by a tip, thereby preventing torsional deformation of the blade during rotation. An air gap formed between the lower blade and the upper blade may be spaced apart from the blades in a vertical direction and a horizontal direction, such that air flowing along the positive pressure surface of the upper blade may flow through the air gap to the negative pressure surface of the lower blade.

Embodiments disclosed herein provide a ceiling fan capable of increasing an air volume by maximizing a lift force. Further, embodiments disclosed herein provide a ceiling fan having blades formed as tandem blades.

In embodiments disclosed herein, a blade may include a lower blade and an upper blade and be formed as a tandem blade with an air gap formed between the lower blade and the upper blade, thereby increasing the lift force during rotation.

That is, embodiments disclosed herein provide a ceiling fan that may include a column fixed to a ceiling; a hub case coupled to the column and rotatable with respect to the column; and a plurality of blades disposed at the hub case and arranged radially around the column. Each blade may include a lower blade having one or a first side coupled to the hub case and an opposite or a second side directed radially outwardly; an upper blade spaced apart from the lower blade, and having one or a first side coupled to the hub case and an opposite or a second side directed radially outwardly; and an air gap disposed between the lower blade and the upper blade. The ceiling fan may further include a tip that connects the opposite side of the lower blade and the opposite side of the upper blade. The upper blade may be disposed above the lower blade, and the air gap may form a height difference.

The lower blade may include a lower end of a lower portion forming a lower edge in a radial direction; an upper end of the lower portion forming an upper edge in the radial direction; an opposite or second side of the lower portion which is coupled to the tip; one or a first side of the lower portion which is coupled to the hub case; a lower positive pressure surface that connects the lower end and the upper end of the lower portion and directed downwardly; and a lower negative pressure surface that connects the lower end and the upper end of the lower portion and directed upwardly. The upper end and the lower end of the lower portion may be linearly formed.

One side of the lower end of the lower portion may be disposed below the opposite side of the lower portion. The lower end of the lower portion may form an inclination angle of four degrees with respect to a horizontal direction.

The lower positive pressure surface and the lower negative pressure surface may be formed as curved surfaces, which are concave upward from bottom.

A radius of curvature R1 of the one side of the lower blade may be in a range of 90 mm to 95 mm, and may be located on a lower side of the lower blade. A radius of curvature R3 of the opposite side of the lower blade may be in a range of 130 mm to 140 mm, and may be located on the lower side of the lower blade.

The opposite side of the lower blade, having the radius of curvature, may be formed as a smoother curved surface compared to the radius of curvature of the one side of the lower blade.

The upper blade may include a lower end of an upper portion forming a lower edge in the radial direction; an upper end of the upper portion forming an upper edge in the radial direction; an opposite or second side of the upper portion which is coupled to the tip; one or a first side of the upper portion which is coupled to the hub case; an upper positive pressure surface that connects the lower end and the upper end of the upper portion and directed downwardly; and an upper negative pressure surface that connects the lower end and the upper end of the upper portion and directed upwardly. The air gap may be disposed between the upper end of the lower portion and the lower end of the upper portion.

The upper end of the lower portion may be disposed above the lower end of the upper portion. The upper end and the lower end of the upper portion may be linearly formed.

One or a first side of the upper end of the upper portion may be disposed above the opposite or a second side of the upper portion. The upper end of the upper portion may form an inclination angle of four degrees with respect to a horizontal direction. The upper positive pressure surface and the upper negative pressure surface may be formed as curved surfaces, which are concave upward from bottom.

A radius of curvature R2 of the one side of the upper blade may be in a range of 85 mm to 90 mm, and may be located on a lower side of the upper blade. A radius of curvature R4 of the opposite side of the upper blade may be in a range of 280 mm to 290 mm, and may be located on the lower side of the upper blade.

The opposite side of the upper blade, having the radius of curvature, may be formed as a smoother curved surface compared to the radius of curvature of the one side of the upper blade.

The blade according to embodiments disclosed herein is formed as a tandem blade, thereby generating a greater lift force than the blade having one positive pressure surface and one negative pressure surface, such that an air volume may increase at a same power output. Further, the blade having the lower blade and the upper blade has a same width in a radial direction, such that the lower blade and the upper blade may be operated as one blade.

Furthermore, radially outer sides of the lower blade and the upper blade are connected by a tip, thereby preventing torsional deformation of the blade during rotation. Also, an air gap formed between the lower blade and the upper blade is vertically and horizontally spaced apart from the blades, such that air flowing along the positive pressure surface of the upper blade may flow through the air gap to the negative pressure surface of the lower blade.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A ceiling fan, comprising:
- a column;
- a hub case coupled to the column and rotatable with respect to the column; and
- a plurality of blades disposed at the hub case, wherein each blade comprises:
  - a lower blade having a first side coupled to the hub case and a second side, opposite to the first side, directed radially outwardly;
  - an upper blade spaced apart from the lower blade, having a first side coupled to the hub case, and a second side, opposite to the first side, directed radially outwardly;
  - an air gap defined between the lower blade and the upper blade, which are spaced apart from each other; and
  - a tip that connects the second side of the lower blade and the second side of the upper blade.

2. The ceiling fan of claim 1, wherein the upper blade is disposed above the lower blade, and the air gap forms a height difference.

3. The ceiling fan of claim 1, wherein the lower blade comprises:
- a lower end of a lower portion forming a lower edge in a radial direction;
- an upper end of the lower portion forming an upper edge in the radial direction;
- a first side of the lower portion which is coupled to the hub case;
- a second side of the lower portion which is coupled to the tip;
- a lower positive pressure surface that connects the lower end and the upper end of the lower portion and directed downwardly; and
- a lower negative pressure surface that connects the lower end and the upper end of the lower portion and directed upwardly.

4. The ceiling fan of claim 3, wherein the upper end and the lower end of the lower portion are linear.

5. The ceiling fan of claim 3, wherein a first side of the lower end of the lower portion is disposed below a second side of the lower portion.

6. The ceiling fan of claim 3, wherein the lower end of the lower portion forms an inclination angle with respect to a horizontal direction.

7. The ceiling fan of claim 3, wherein the lower positive pressure surface and the lower negative pressure surface are curved surfaces, which are concave with respect to a bottom thereof.

8. The ceiling fan of claim 3, wherein a radius of curvature of the first side of the lower blade is located on a lower side of the lower blade.

9. The ceiling fan of claim 3, wherein a radius of curvature of the second side of the lower blade is located on a lower side of the lower blade.

10. The ceiling fan of claim 3, wherein a radius of curvature of the second side of the lower blade is greater than a radius of curvature of the first side of the lower blade.

11. The ceiling fan of claim 3, wherein the upper blade comprises:
- a lower end of an upper portion forming a lower edge in the radial direction;
- an upper end of the upper portion forming an upper edge in the radial direction;
- a first side of the upper portion which is coupled to the hub case;
- a second side of the upper portion which is coupled to the tip;
- an upper positive pressure surface that connects the lower end and the upper end of the upper portion and directed downwardly; and
- an upper negative pressure surface that connects the lower end and the upper end of the upper portion and directed upwardly.

12. The ceiling fan of claim 11, wherein the air gap is disposed between the upper end of the lower portion and the lower end of the upper portion.

13. The ceiling fan of claim 11, wherein the upper end of the lower portion is disposed above the lower end of the upper portion.

14. The ceiling fan of claim 11, wherein the upper end and the lower end of the upper portion are linear.

15. The ceiling fan of claim 11, wherein a first side of the upper end of the upper portion is disposed above a second side of the upper portion.

16. The ceiling fan of claim 11, wherein the upper end of the upper portion forms an inclination angle with respect to a horizontal direction.

17. The ceiling fan of claim 11, wherein the upper positive pressure surface and the upper negative pressure surface are curved surfaces which are concave with respect to a bottom thereof.

18. The ceiling fan of claim 11, wherein:
- a radius of curvature of the first side of the upper blade is located on a lower side of the upper blade; and
- a radius of curvature of the second side of the upper blade is located on the lower side of the upper blade.

19. The ceiling fan of claim 11, wherein a radius of curvature of the second side of the upper blade is greater than a radius of curvature of the first side of the upper blade.

20. A ceiling fan, comprising:
- a column;
- a hub case coupled to the column and rotatable with respect to the column; and
- a plurality of blades disposed at the hub case, wherein each blade comprises:
  - a lower blade having first side coupled to the hub case and a second side, opposite to the first side, directed radially outwardly;
  - an upper blade spaced apart from the lower blade, having a first side coupled to the hub case, and a second side, opposite to the first side, directed radially outwardly;
  - an air gap defined between the lower blade and the upper blade, which are spaced apart from each other; and
  - a tip that connects the second side of the lower blade and the second side of the upper blade, wherein the air gap extends in both horizontal and vertical directions.

21. A ceiling fan, comprising:
- a column;
- a hub case coupled to the column and rotatable with respect to the column; and
- a plurality of blades disposed at the hub case, wherein each blade comprises:
  - a lower blade having first side coupled to the hub case and a second side, opposite to the first side, directed radially outwardly;
  - an upper blade spaced apart from the lower blade, having a first side coupled to the hub case, and a second side, opposite to the first side, directed radially outwardly;
  - an air gap defined between the lower blade and the upper blade, which are spaced apart from each other; and
  - a tip that connects the second side of the lower blade and the second side of the upper blade, wherein a radius of curvature of the respective second sides of the lower blade and the upper blade is smaller than a radius of curvature of the respective first sides of the lower blade and the upper blade.

* * * * *